US011579040B2

(12) United States Patent
Kinoshita et al.

(10) Patent No.: US 11,579,040 B2
(45) Date of Patent: Feb. 14, 2023

(54) DAMAGE DIAGNOSIS DEVICE, DAMAGE DIAGNOSIS METHOD, AND RECORDING MEDIUM IN WHICH DAMAGE DIAGNOSIS PROGRAM IS STORED

(71) Applicant: NEC Corporation, Tokyo (JP)

(72) Inventors: Shohei Kinoshita, Tokyo (JP); Shigeru Kasai, Tokyo (JP); Yu Kiyokawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 296 days.

(21) Appl. No.: 16/769,869

(22) PCT Filed: Dec. 3, 2018

(86) PCT No.: PCT/JP2018/044341
§ 371 (c)(1),
(2) Date: Jun. 4, 2020

(87) PCT Pub. No.: WO2019/111841
PCT Pub. Date: Jun. 13, 2019

(65) Prior Publication Data
US 2021/0172828 A1    Jun. 10, 2021

(30) Foreign Application Priority Data
Dec. 7, 2017    (JP) .............................. JP2017-234804

(51) Int. Cl.
*G01M 7/02*    (2006.01)
*G01G 19/02*    (2006.01)
(Continued)

(52) U.S. Cl.
CPC ............ *G01M 7/025* (2013.01); *G01G 19/02* (2013.01); *G01J 5/00* (2013.01); *G01P 15/00* (2013.01); *G01J 2005/0077* (2013.01)

(58) Field of Classification Search
CPC ................................ G01M 7/025; G01P 15/00
See application file for complete search history.

(56) References Cited

U.S. PATENT DOCUMENTS

| 4,565,997 | A  | * | 1/1986  | Seko  | ..................... | B60K 28/066 340/576 |
| 8,290,718 | B2 | * | 10/2012 | Lee   | ....................... | G01M 7/025 702/56 |
| 2010/0242609 | A1 |   | 9/2010  | Lee et al. | | |

FOREIGN PATENT DOCUMENTS

| JP | 2001-074547 A | 3/2001 |
| JP | 2004-252520 A | 9/2004 |

(Continued)

OTHER PUBLICATIONS

Yasuhiro Nakano, et al., "Soundness test method of bridge using natural frequency", Proceedings of Annual Conference of the Japan Society of Civil Engineers, Sep. 2011, pp. 503-504, vol. 66, No. VI-252.

(Continued)

*Primary Examiner* — Bryan Bui
(74) *Attorney, Agent, or Firm* — Sughrue Mion, PLLC

(57) ABSTRACT

A damage diagnosis device is provided with: a detection unit for detecting that, immediately after a vehicle crossing a bridge has exited from the bridge, another vehicle is not crossing the bridge; a determination unit for determining whether the weight of the vehicle satisfies a criterion; and a diagnosis unit that, when the detection unit has detected that no other vehicle is crossing the bridge and the determination unit has determined that the weight of the vehicle satisfies the criterion, diagnoses damage to the bridge on the basis of information representing free vibration generated in the bridge due to the crossing of the vehicle, thereby improving the precision of diagnosis when damage to a bridge is diagnosed on the basis of information representing free (Continued)

vibration generated in the bridge due to the crossing of a vehicle.

15 Claims, 12 Drawing Sheets

(51) Int. Cl.
*G01J 5/00* (2022.01)
*G01P 15/00* (2006.01)

(56) References Cited

FOREIGN PATENT DOCUMENTS

| | | |
|---|---|---|
| JP | 2007-270552 A | 10/2007 |
| JP | 2013-053770 A | 3/2013 |
| JP | 2015-102329 A | 6/2015 |
| JP | 2015-183362 A | 10/2015 |
| JP | 2016-084579 A | 5/2016 |
| JP | 2016-125229 A | 7/2016 |
| WO | 2013/190973 A1 | 12/2013 |

OTHER PUBLICATIONS

International Search Report for PCT/JP2018/044341 dated Feb. 26, 2019 (PCT/ISA/210).

* cited by examiner

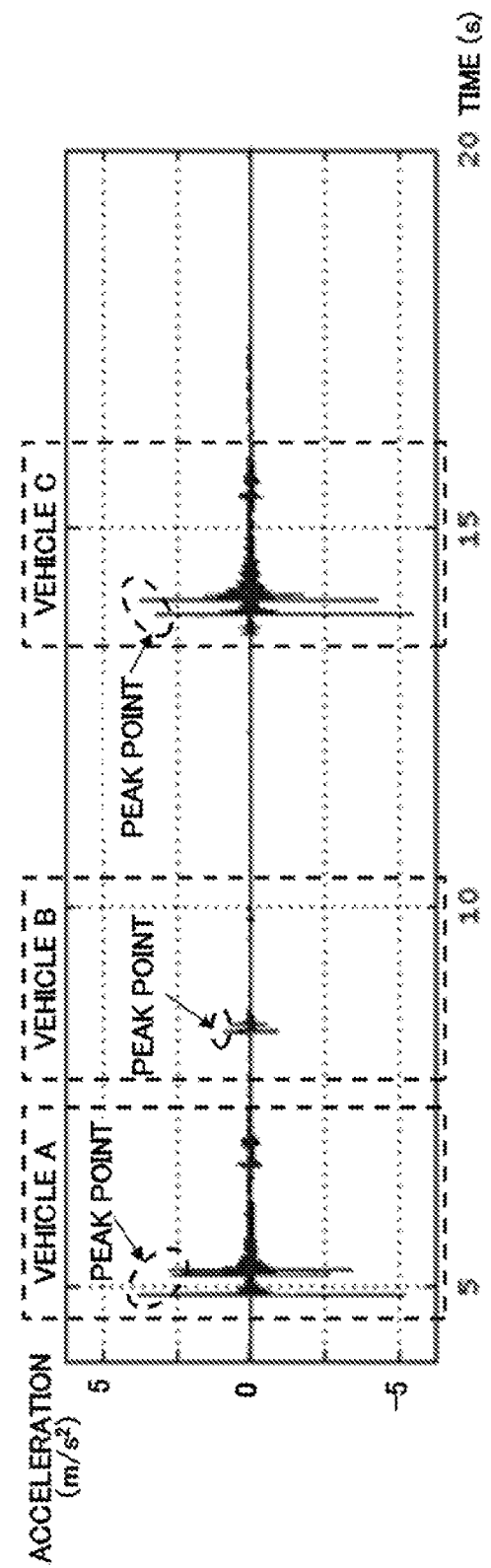

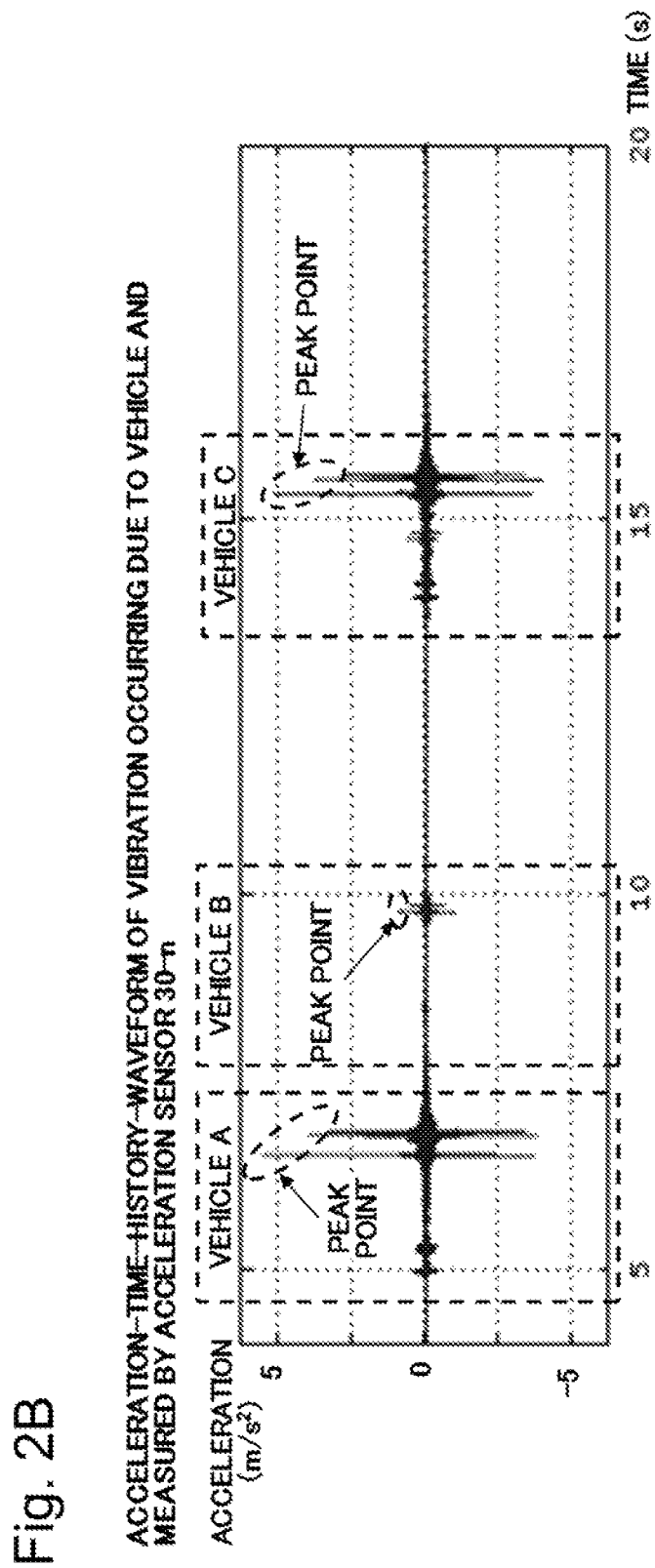

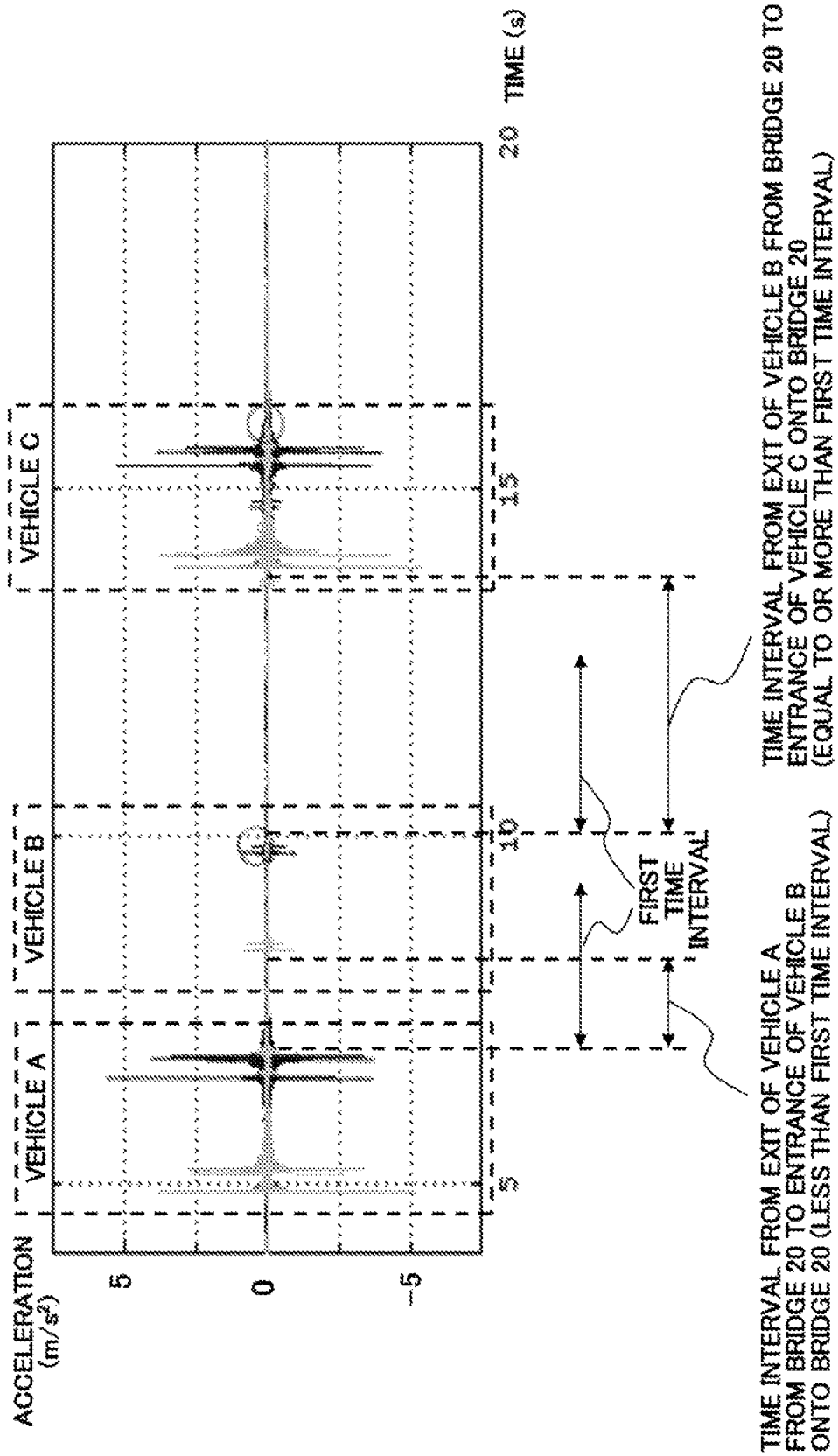

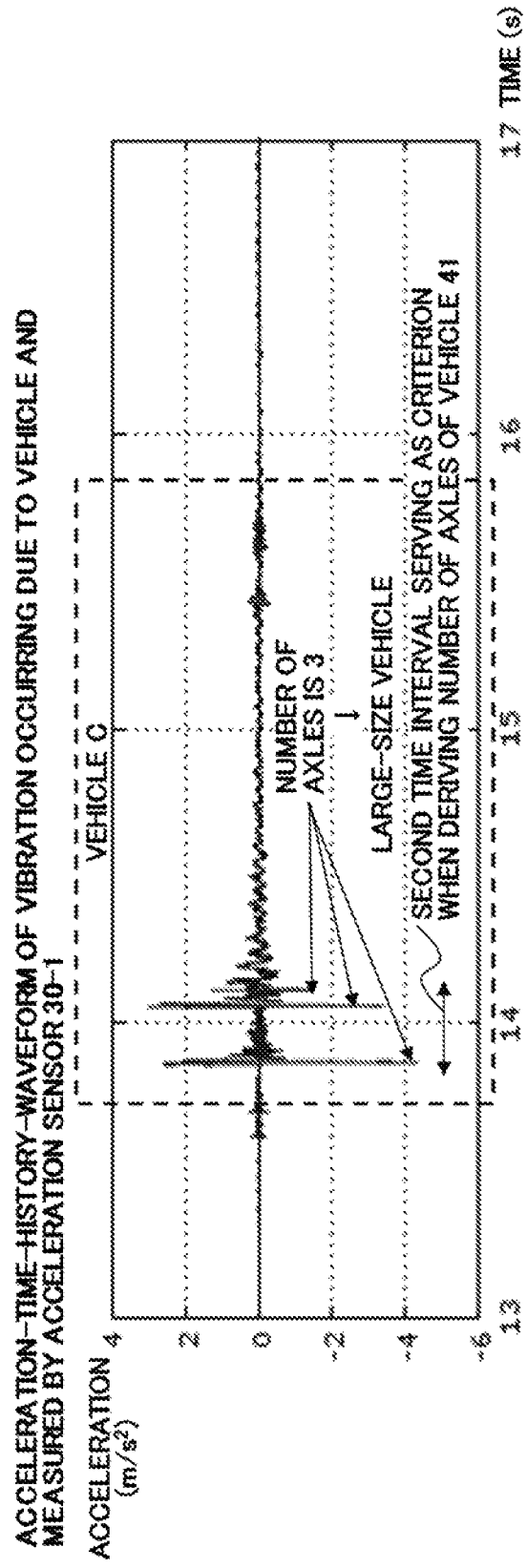

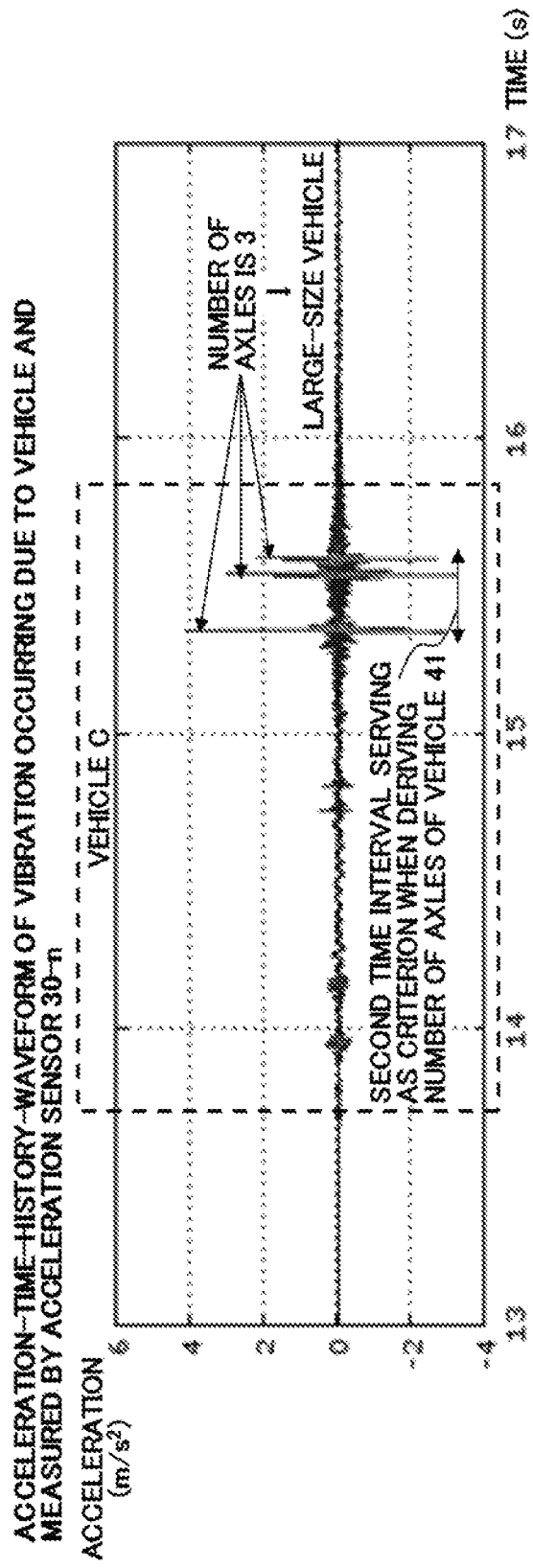

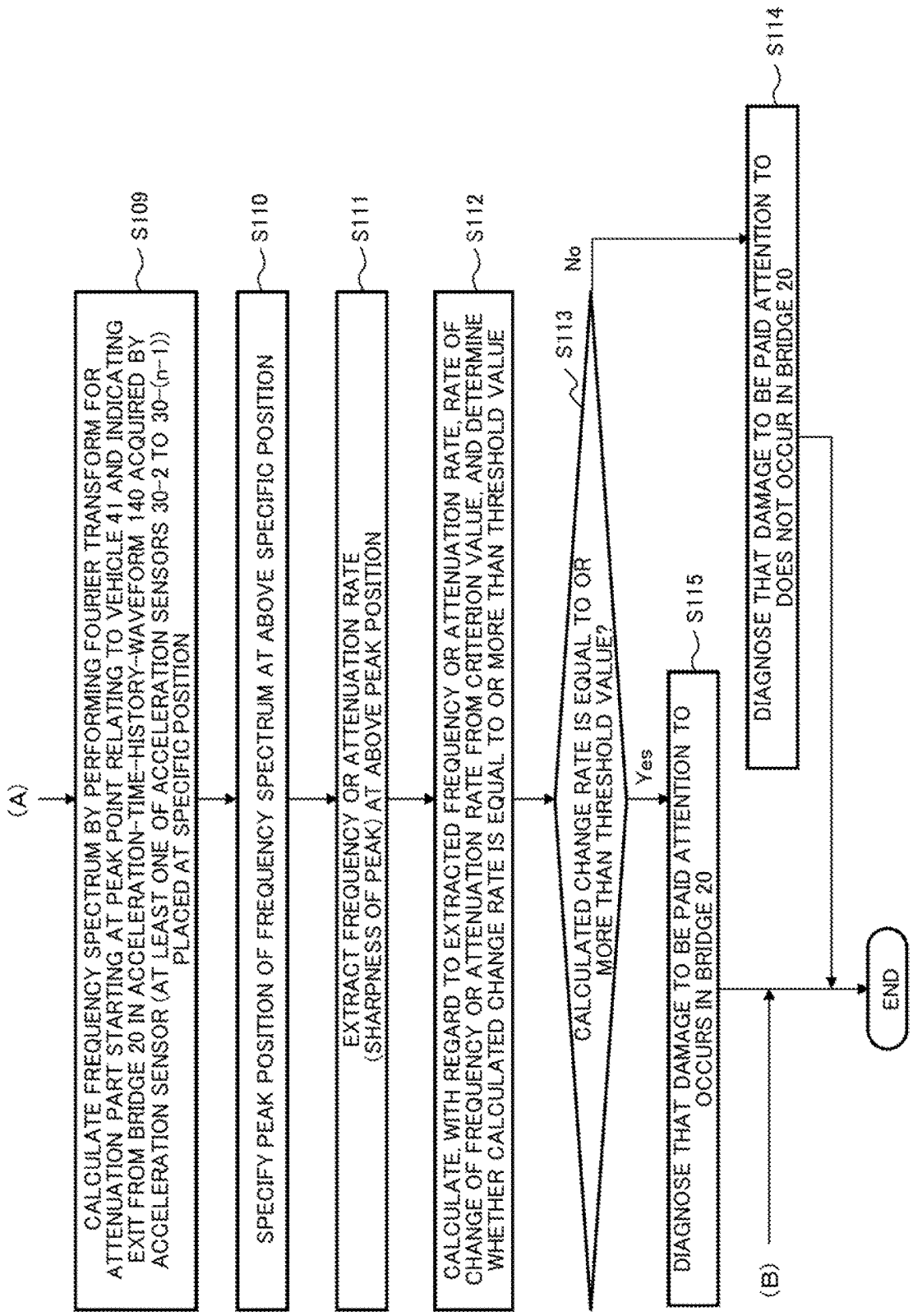

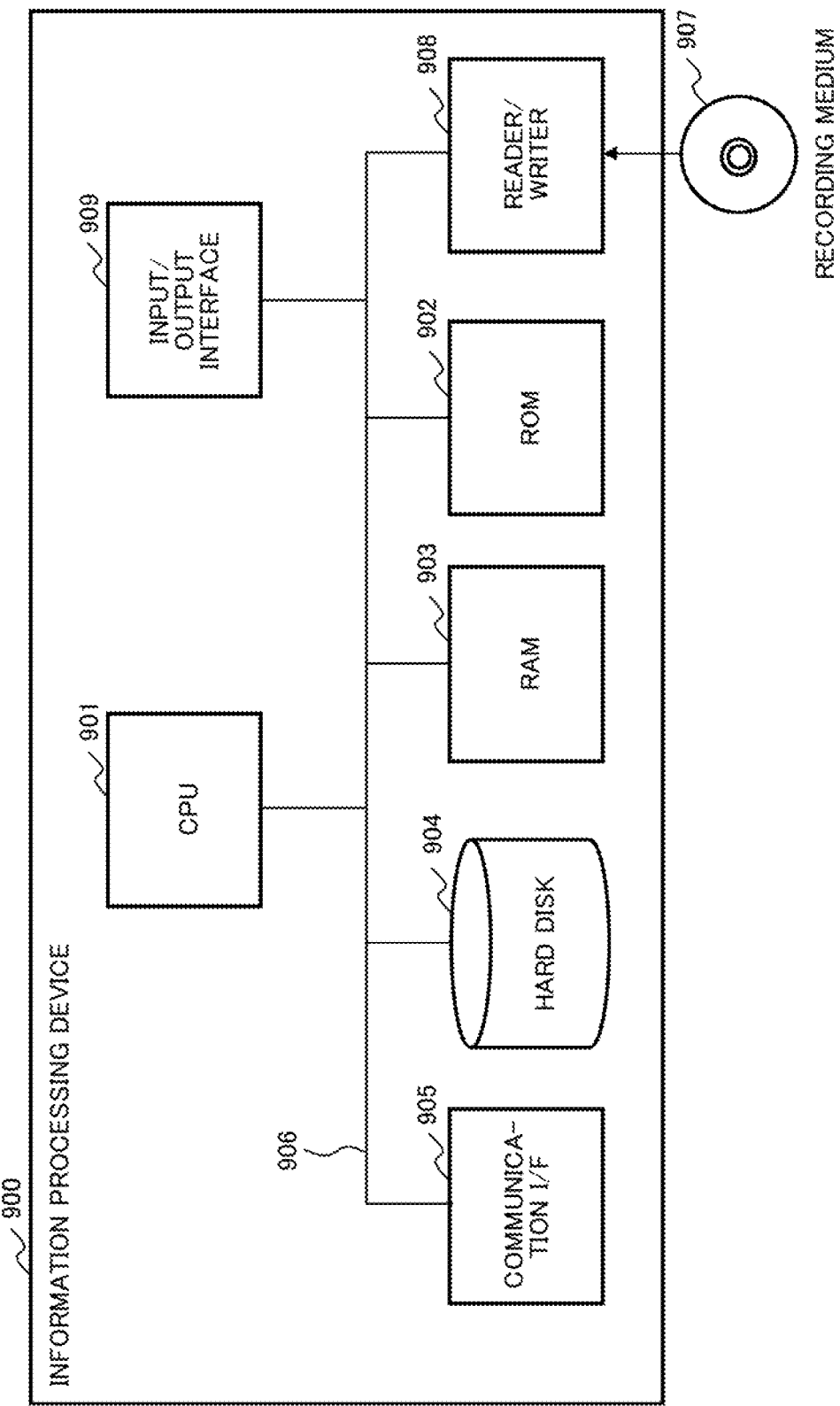

DAMAGE DIAGNOSIS DEVICE, DAMAGE DIAGNOSIS METHOD, AND RECORDING MEDIUM IN WHICH DAMAGE DIAGNOSIS PROGRAM IS STORED

CROSS REFERENCE TO RELATED APPLICATIONS

This application is a National Stage of International Application No. PCT/JP2018/044341 filed Dec. 3, 2018, claiming priority based on Japanese Patent Application No. 2017-234804 filed Dec. 7, 2017, the disclosure of which is incorporated herein in its entirety by reference.

TECHNICAL FIELD

The invention of the present application relates to a technique of diagnosing damage occurring in a bridge, based on information representing free vibration occurring in the bridge due to crossing of a vehicle.

BACKGROUND ART

Expectation has been rising for a technique of more accurately diagnosing damage occurring in a structure, in such a way that occurrence of an accident resulting from damage occurring in an aging structure such as a bridge can be prevented.

As a technique pertaining to such a technique, PTL 1 discloses a structure state determination device including a vibration detection means for detecting vibration of a structure, and a calculation means for performing calculation processing with regard to vibration waveform data acquired by the vibration detection means. The calculation means in this device performs an attenuated waveform analysis, and determines, based on a result of the analysis, a state of the structure, with regard to vibration waveform data at and after a time point when an absolute value of a peak is maximum in the vibration waveform data.

PTL 2 discloses a crack occurrence diagnosis method for a concrete structure to which strain is caused by a load. This diagnosis method performs, on a concrete structure, loading by which strain occurs, and measures, with time, displacement caused by the loading. This method resolves a vibration waveform generated from the measured displacement into a positive-side amplitude and a negative-side amplitude, and calculates each half cycle being a time interval of each half wavelength constituting each of the positive-side amplitude and the negative-side amplitude. Then, this method calculates, from the half cycle, an instantaneous frequency being a frequency at a time point when each half wavelength occurs, and determines a crack occurrence situation of the concrete structure by comparing the instantaneous frequency of the positive-side amplitude with the instantaneous frequency of the negative-side amplitude.

PTL 3 discloses a road monitoring system that detects, by use of one kind of sensor, the number of vehicle passages, a traveling speed, and vehicle weight, being necessary for road management. This system includes vibration sensors being placed in a roadbed of a road, and spaced apart from each other in a traveling direction of a vehicle, and derives the number of vehicle passages by counting the number of vibration detections by the vibration sensors. This system also derives a traveling speed of a vehicle, based on a detection time difference between the vibration sensors, and further estimates weight of the vehicle, based on magnitude of an amplitude of detected vibration and the traveling speed.

PTL 4 discloses a characteristic display system that visualizes and displays vibration measurement data relating to physical quantities such as displacement, a speed, acceleration, and sound pressure in a measured target such as a rotor or a vibrator. This system removes, minimizes, or extracts a specific vibration component in the measured target from the measurement data, and then displays the measurement data on a Campbell diagram.

CITATION LIST

Patent Literature

[PTL 1] International Publication No. WO2013/190973
[PTL 2] Japanese Unexamined Patent Application Publication No. 2013-053770
[PTL 3] Japanese Unexamined Patent Application Publication No. 2004-252520
[PTL 4] Japanese Unexamined Patent Application Publication No. 2001-074547

Non Patent Literature

[NPL 1] "Soundness test method of bridge using natural frequency", Yasuhiro Nakano, Genki Kubo, Hajime Kubo, Shigeo Kaneda, Proceedings of Annual Conference of the Japan Society of Civil Engineers, Vol. 66, No. VI-252, pp. 503 and 504, September 2011.

SUMMARY OF INVENTION

Technical Problem

A general structure changes in a mechanical characteristic (rigidity, viscosity, or the like) thereof due to occurrence and advance (aggravation) of damage, and therefore, damage occurring in a structure can be diagnosed by concentrating on vibration occurring in the structure. When a damage diagnosis target is a bridge, damage can be diagnosed by measuring free vibration occurring in the bridge after a vehicle crosses the bridge, for example, as described in NPL 1.

However, when diagnosing damage to a bridge by the method described above, there is fear that a wrong diagnosis is made due to the following factors. Specifically, when, in a state where free vibration occurs in a bridge after a vehicle crosses the bridge, another vehicle (a vehicle behind the former vehicle) travels on the bridge, vibration occurring due to the traveling of the another vehicle is mixed into the free vibration, and therefore, it becomes difficult to accurately measure the free vibration. Alternatively, when the vehicle is not, for example, a large-size vehicle (weight thereof does not satisfy a criterion), free vibration that occurs is small, and thus, it becomes difficult to extract, with high precision, a change in a mechanical characteristic of a bridge being indicated by the free vibration.

Specifically, the present inventors have found out that elimination of the above-described factor of a wrong diagnosis is a problem when diagnosing damage to a bridge by measuring free vibration occurring in the bridge after a vehicle crosses the bridge. PTLs 1 to 4 do not refer to this problem. A main object of the invention of the present application is to provide a damage diagnosis device and the like that solve this problem.

Solution to Problem

A damage diagnosis device according to one aspect of the invention of the present application includes: a detection means for detecting that, after a vehicle crossing a bridge exits from the bridge, crossing of another vehicle over the bridge does not occur; a determination means for determining whether weight of the vehicle satisfies a criterion; and a diagnosis means for diagnosing damage to the bridge, based on information representing free vibration occurring in the bridge due to crossing of the vehicle, when the detection means detects that crossing of the another vehicle over the bridge does not occur and the determination means determines that the weight of the vehicle satisfies the criterion.

In another viewpoint of achieving the object described above, a damage diagnosis method according to one aspect of the invention of the present application includes: by an information processing device, detecting that, after a vehicle crossing a bridge exits from the bridge, crossing of another vehicle over the bridge does not occur; determining whether weight of the vehicle satisfies a criterion; and diagnosing damage to the bridge, based on information representing free vibration occurring in the bridge due to crossing of the vehicle, when detecting that crossing of the another vehicle over the bridge does not occur and determining that the weight of the vehicle satisfies the criterion.

In still another viewpoint of achieving the object described above, a damage diagnosis program according to one aspect of the invention of the present application is a program causing a computer to execute: detection processing of detecting that, after a vehicle crossing a bridge exits from the bridge, crossing of another vehicle over the bridge does not occur; determination processing of determining whether weight of the vehicle satisfies a criterion; and diagnosis processing of diagnosing damage to the bridge, based on information representing free vibration occurring in the bridge due to crossing of the vehicle, when the detection processing detects that crossing of the another vehicle over the bridge does not occur and the determination processing determines that the weight of the vehicle satisfies the criterion.

Furthermore, the invention of the present application is also achievable by a computer-readable non-volatile recording medium in which the damage diagnosis program (computer program) is stored.

Advantageous Effects of Invention

The invention of the present application enables improvement in diagnosis precision, when diagnosing damage occurring in a bridge, based on information representing free vibration occurring in the bridge due to crossing of a vehicle.

BRIEF DESCRIPTION OF DRAWINGS

FIG. 2A is a diagram exemplifying an acceleration-time-history-waveform 140 of vibration occurring due to a vehicle crossing a bridge 20 and measured by an acceleration sensor 30-1 according to the first example embodiment of the invention of the present application.

FIG. 2B is a diagram exemplifying the acceleration-time-history-waveform 140 of the vibration occurring due to the vehicle crossing the bridge 20 and measured by an acceleration sensor 30-$n$ according to the first example embodiment of the invention of the present application.

FIG. 3 is a diagram describing an example in which a detection unit 11 according to the first example embodiment of the invention of the present application detects, based on the acceleration-time-history-waveforms 140 exemplified in FIGS. 2A and 2B, that, after a vehicle 41 exits from the bridge 20, another vehicle 42 crossing the bridge 20 does not exist.

FIG. 5A is a diagram describing an example in which the determination unit 12 according to the first example embodiment of the invention of the present application determines, based on the acceleration-time-history-waveform 140 exemplified in FIG. 2A, that the weight of the vehicle 41 satisfies the criterion.

FIG. 5B is a diagram describing an example in which the determination unit 12 according to the first example embodiment of the invention of the present application determines, based on the acceleration-time-history-waveform 140 exemplified in FIG. 2B, that the weight of the vehicle 41 satisfies the criterion.

FIG. 6B is a flowchart (2/2) illustrating the operation of the damage diagnosis device 10 according to the first example embodiment of the invention of the present application.

FIG. 8 is a block diagram illustrating a configuration of an information processing device 900 being capable of executing the damage diagnosis device according to each example embodiment of the invention of the present application.

EXAMPLE EMBODIMENT

Hereinafter, example embodiments of the invention of the present application will be described in detail with reference to the drawings.

First Example Embodiment

Figure 1:
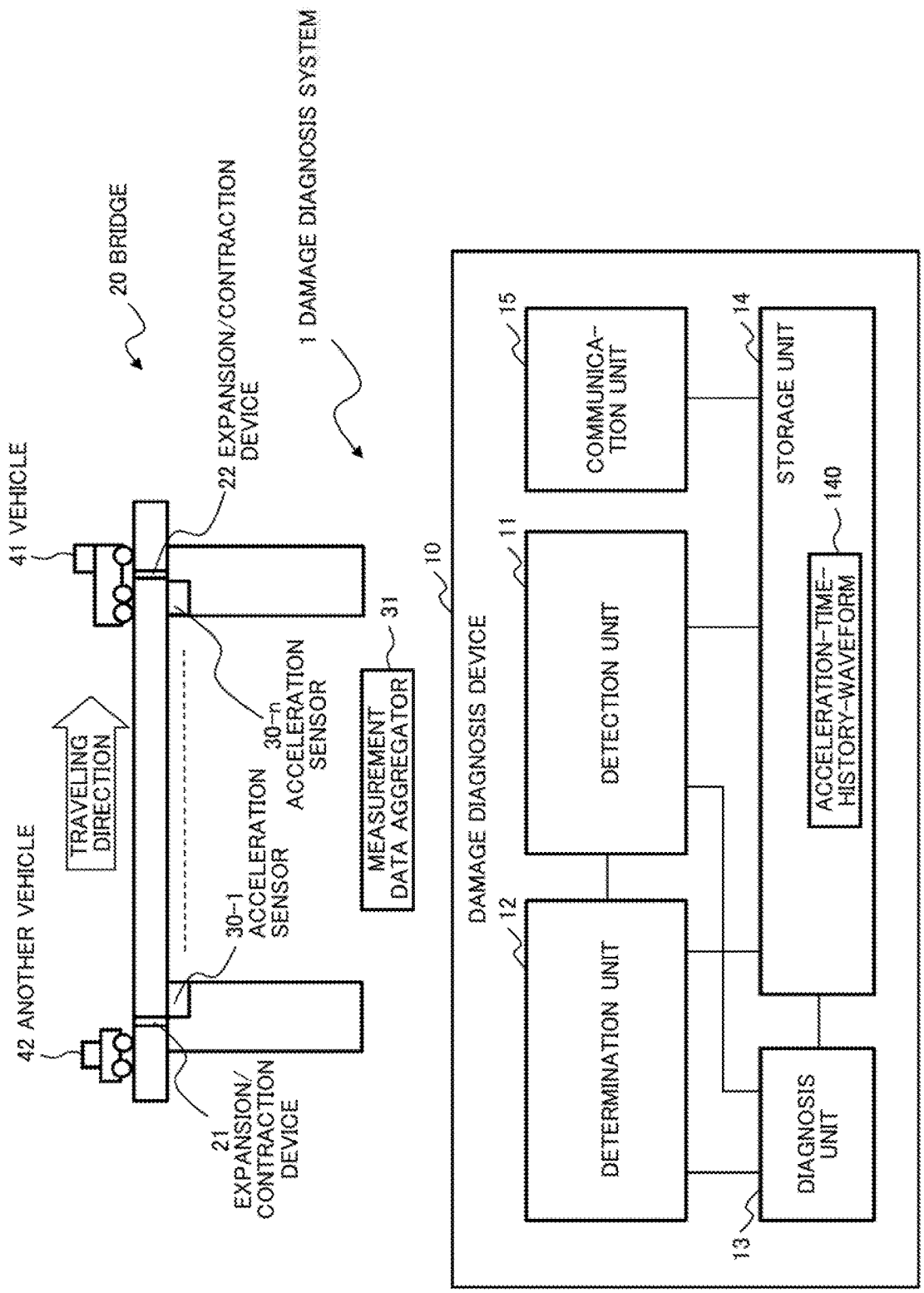
FIG. 1 is a block diagram conceptually illustrating a configuration of a damage diagnosis system 1 according to a first example embodiment of the invention of the present application.

FIG. 1 is a block diagram conceptually illustrating a configuration of a damage diagnosis system 1 according to a first example embodiment of the invention of the present application. The damage diagnosis system 1 broadly includes a damage diagnosis device 10, acceleration sensors 30-1 to 30-$n$ (n is any integer equal to or more than 3), and a measurement data aggregator 31. Note that there exist a total of at least three acceleration sensors 30-1 to 30-$n$ including those that are placed in the vicinity of expansion/contraction devices 21 and 22, and those that collect measurement data relating to information (an acceleration time history characteristic) representing an acceleration-time-history-waveform 140 used when a diagnosis unit 13 performs diagnosis, as described later. The acceleration-time-history-waveform 140, inclusive of information representing the acceleration-time-history-waveform 140, is hereinafter simply referred to as the acceleration-time-history-waveform 140 in the present application. The damage diagnosis device 10 is a device that diagnoses damage occurring in the bridge 20. The damage diagnosis device 10 diagnoses damage occurring in the bridge 20, based on data acquired by measuring free vibration occurring in the bridge 20 after a vehicle 41 crosses the bridge 20.

In the present example embodiment, it is assumed, for convenience of description, that a traveling direction of the vehicle 41 traveling on the bridge 20 is one direction, and a vehicle facing the vehicle 41 (traveling in a direction opposite to the vehicle 41) travels, for example, on a bridge different as a structure from the bridge 20. The expansion/contraction device 21 is placed in a part where the vehicle 41 enters (goes into) the bridge 20, and the expansion/contraction device 22 is placed in a part where the vehicle 41 exits (goes out) from the bridge 20. The expansion/contraction devices 21 and 22 are placed on road surface ends of the bridge 20 (an entrance part onto the bridge 20 and an exit part from the bridge 20), and are devices that absorb expansion/contraction of the bridge 20 resulting from a temperature change, deformation of the bridge 20 due to crossing of the vehicle 41, and the like.

As exemplified in FIG. 1, the acceleration sensor 30-1 is placed in the vicinity of the expansion/contraction device 21, and the acceleration sensor 30-*n* is placed in the vicinity of the expansion/contraction device 22. The acceleration sensor other than the acceleration sensors 30-1 and 30-*n* among the acceleration sensors 30-1 to 30-*n* is placed in any part between the expansion/contraction device 21 and the expansion/contraction device 22 on the bridge 20. The acceleration sensors 30-1 to 30-*n* are sensors capable of measuring acceleration at which the bridge 20 vibrates. Specifically, the acceleration sensors 30-1 to 30-*n* measure acceleration at which the bridge 20 vibrates, in the vicinity of the expansion/contraction devices 21 and 22 in order.

The measurement data aggregator 31 acquires, at a predetermined timing, measurement data collected by the acceleration sensors 30-1 to 30-*n* and relating to acceleration at which the bridge 20 vibrates, by performing, for example, wireless communication with the acceleration sensors 30-1 to 30-*n*. The measurement data aggregator 31 transmits the acquired measurement data to the damage diagnosis device 10 at a predetermined timing by, for example, wireless communication.

The damage diagnosis device 10 includes a detection unit 11, a determination unit 12, the diagnosis unit 13, a storage unit 14, and a communication unit 15.

The communication unit 15 receives measurement data collected by the acceleration sensors 30-1 to 30-*n* and relating to acceleration at which the bridge 20 vibrates, by performing, for example, wireless communication with the measurement data aggregator 31.

The storage unit 14 is a storage device such as an electronic memory or a magnetic disk. The storage unit 14 stores the measurement data received by the communication unit 15, collected by the acceleration sensors 30-1 to 30-*n*, and relating to acceleration at which the bridge 20 vibrates. In the present example embodiment, it is assumed that the storage unit 14 stores the acceleration-time-history-waveform 140 generated based on the measurement data. It is assumed that the acceleration-time-history-waveform 140 is a waveform representing acceleration of vibration varying with elapse of time, and is generated by, for example, the measurement data aggregator 31, or the damage diagnosis device 10 or the like, based on the measurement data collected by the acceleration sensors 30-1 to 30-*n*. The storage unit 14 is capable of storing information (data) generated by the detection unit 11, the determination unit 12, and the diagnosis unit 13 that are described later.

FIGS. 2A and 2B are diagrams exemplifying the acceleration-time-history-waveforms 140 relating to vibration occurring due to the vehicle 41 crossing the bridge 20 and measured by the acceleration sensors 30-1 and 30-*n* according to the present example embodiment. FIG. 2A represents the acceleration-time-history-waveform 140 relating to vibration occurring due to the vehicle 41 and measured by the acceleration sensor 30-1 placed on an entrance side (in the vicinity of the expansion/contraction device 21) onto the bridge 20. FIG. 2B represents the acceleration-time-history-waveform 140 relating to vibration occurring due to the vehicle 41 and measured by the acceleration sensor 30-*n* placed on an exit side (in the vicinity of the expansion/contraction device 22) from the bridge 20. A vertical axis of a graph representing the acceleration-time-history-waveform 140 represents acceleration (meter per second) of vibration, and a horizontal axis represents elapsed time (second).

The acceleration-time-history-waveforms 140 exemplified in FIGS. 2A and 2B represent acceleration-time-history-waveforms when three vehicles (vehicles A, B, and C) cross the bridge 20 in order. As exemplified in each of FIGS. 2A and 2B, the acceleration-time-history-waveform 140 includes a peak point (a point indicating a moment when acceleration of vibration becomes maximum within a certain period of approaching on a time axis). The peak point in FIG. 2A is a point representing a moment when an axle (a pair of tires) included in the vehicle 41 passes an upper part of the expansion/contraction device 21. The peak point in FIG. 2B is a point representing a moment when the axle included in the vehicle 41 passes an upper part of the expansion/contraction device 22. In the examples illustrated in FIGS. 2A and 2B, a point, on a positive-value side of acceleration, indicating a moment when acceleration of vibration becomes maximum is designated as a peak point but a point, on a negative-value side of acceleration, indicating a moment when acceleration (an absolute value) of vibration becomes maximum may be designated as a peak point.

The peak points exist, for each vehicle, as many as the number of axles included in the vehicle. Specifically, since, for example, a general passenger car includes two axles (i.e., four tires), peak points occurring due to passage of the passenger car across the upper part of the expansion/contraction device 21 or 22 are "2". Moreover, peak points occurring due to passage of a large-size vehicle such as a truck including three axles (i.e., six tires) across the upper part of the expansion/contraction device 21 or 22 are "3".

Vibration occurring due to the vehicle 41 crossing the bridge 20 becomes greater as weight of the vehicle 41 is greater. Therefore, the acceleration-time-history-waveforms 140 illustrated in FIGS. 2A and 2B indicate that the vehicles A and C are vehicles having great weight, and the vehicle B is a vehicle having small weight.

The detection unit 11 illustrated in FIG. 1 generates a band-limiting signal (an acceleration-time-history-waveform after frequency-band-limiting-processing is applied) by applying the frequency-band-limiting-processing with regard to the acceleration-time-history-waveform 140, in order to extract a peak point in the acceleration-time-history-waveform 140 stored in the storage unit 14. The frequency-band-limiting-processing refers to, for example, finite impulse response (FIR) type or infinite impulse response (IIR) type band pass filter processing.

The detection unit 11 calculates a difference value relating to adjacent sample points with regard to the generated band-limiting signal, and extracts, as a peak point, a point where a sign of the difference value is inverted from positive to negative. Specifically, the detection unit 11 extracts a peak point by performing peak picking processing of extracting a sign change point of a first derivative.

Alternatively, the detection unit 11 may generate integral information acquired by integrating acceleration in relation to time, in relation to a plurality of different periods in the generated band-limiting signal, and extract a peak point, based on a plurality of pieces of generated integral information. More specifically, the detection unit 11 divides, for example, a band-limiting signal for 10 seconds into 0.1-second 100 periods, and derives an integral value acquired by integrating in relation to time at each of the periods. In this instance, the detection unit 11 may derive the integral value by calculating a root-mean-square as indicated in Equation 1, for example, with regard to acceleration at times of a plurality of different sample points included in each period.

$$\text{integral value} = \sqrt{\frac{1}{N}\sum_{i=1}^{N} x_i^2} \quad \text{(Equation 1)}$$

In Equation 1, N represents the number of sample points included in each period (a period of 0.1 seconds in the example described above). In Equation 1, $x_i$ represents acceleration at a time of each sample point.

Then, the detection unit 11 generates a time history waveform relating to a derived integral value, calculates a difference value relating to adjacent sample points with regard to the generated time history waveform, and extracts, as a peak point, a point where a sign of the difference value is inverted from positive to negative.

The detection unit 11 detects, based on the peak point extracted from the acceleration-time-history-waveform 140, that a relation between a timing indicated by the extracted peak point at which the vehicle 41 exits from the bridge 20 and a timing indicated by the extracted peak point at which another vehicle 42 behind the vehicle 41 enters the bridge 20 satisfies a predetermined condition. This predetermined condition is a condition equivalent to a fact that, after the vehicle 41 crossing the bridge 20 exits from the bridge 20, crossing of the another vehicle 42 over the bridge 20 does not occur.

The acceleration-time-history-waveform 140 includes a plurality of peak points related to the individual axles included in the vehicle 41. Since the plurality of peak points related to the individual axles included in the vehicle 41 are proximate on a time axis, it is easy for the detection unit 11 and the later-described determination unit 12 to recognize that the plurality of peak points relate to one vehicle 41, and recognize the plurality of peak points in distinction from a peak point relating to the another vehicle 42. Specifically, the detection unit 11 and the later-described determination unit 12 can accurately recognize which vehicle each peak point included in the acceleration-time-history-waveform 140 relates to.

The detection unit 11 according to the present example embodiment stipulates, as the above-described predetermined condition, that a time interval from exit of the vehicle 41 from the bridge 20 to entrance of the another vehicle 42 onto the bridge 20 is equal to or more than a first time interval. This first time interval is equivalent to a value minimally required as a time interval from exit of the vehicle 41 from the bridge 20 to entrance of the another vehicle 42 onto the bridge 20, in order for the damage diagnosis device 10 according to the present example embodiment to acquire measurement data sufficient to diagnose, with high precision, damage occurring in the bridge as a result of free vibration occurring in the bridge 20 due to crossing of the vehicle 41.

Specifically, for example, when the another vehicle 42 enters the bridge 20 before the vehicle 41 exits from the bridge 20, a time interval from exit of the vehicle 41 from the bridge 20 to entrance of the another vehicle 42 onto the bridge 20 becomes a negative value, and therefore, the detection unit 11 determines that the above-described predetermined condition is not satisfied. Alternatively, for example, when, after the vehicle 41 exits from the bridge 20, the another vehicle 42 enters the bridge 20, but a time interval from exit of the vehicle 41 from the bridge 20 to entrance of the another vehicle 42 onto the bridge 20 is short (less than the first time interval), the detection unit 11 determines that the above-described predetermined condition is not satisfied.

FIG. 3 is a diagram describing that the detection unit 11 according to the present example embodiment detects, based on the acceleration-time-history-waveforms 140 exemplified in FIGS. 2A and 2B, that, after the vehicle 41 exits from the bridge 20, the another vehicle 42 crossing the bridge 20 does not exist. The acceleration-time-history-waveform illustrated in FIG. 3 is composed of the acceleration-time-history-waveforms 140 exemplified in FIGS. 2A and 2B that are displayed over each other by matching time axes thereof.

In the example illustrated in FIG. 3, since the vehicle A, and the vehicle B behind the vehicle A travel in proximity to each other, a time interval from exit of the vehicle A from the bridge 20 to entrance of the vehicle B onto the bridge 20 is less than the first time interval. Therefore, in this case, the detection unit 11 determines that the above-described predetermined condition is not satisfied.

In the example illustrated in FIG. 3, since the vehicle B, and the vehicle C behind the vehicle B travel apart from each other, a time interval from exit of the vehicle B from the bridge 20 to entrance of the vehicle C onto the bridge 20 is equal to or more than the first time interval. Therefore, in this case, the detection unit 11 detects that the above-described predetermined condition is satisfied. The detection unit 11 reports a result of the above-described detection to the diagnosis unit 13. The detection unit 11 may store the detection result in the storage unit 14.

The determination unit 12 illustrated in FIG. 1 extracts a peak point in the acceleration-time-history-waveform 140 stored in the storage unit 14, by performing processing similar to that of the detection unit 11 described above. Then, the determination unit 12 determines, based on the peak point extracted from the acceleration-time-history-waveform 140, whether weight of the vehicle 41 crossing the bridge 20 satisfies a criterion. The determination unit 12 according to the present example embodiment determines, based on the number of axles of the vehicle 41 indicated by the peak point extracted from the acceleration-time-history-waveform 140, whether the weight of the vehicle 41 satisfies the criterion.

Figure 4A:
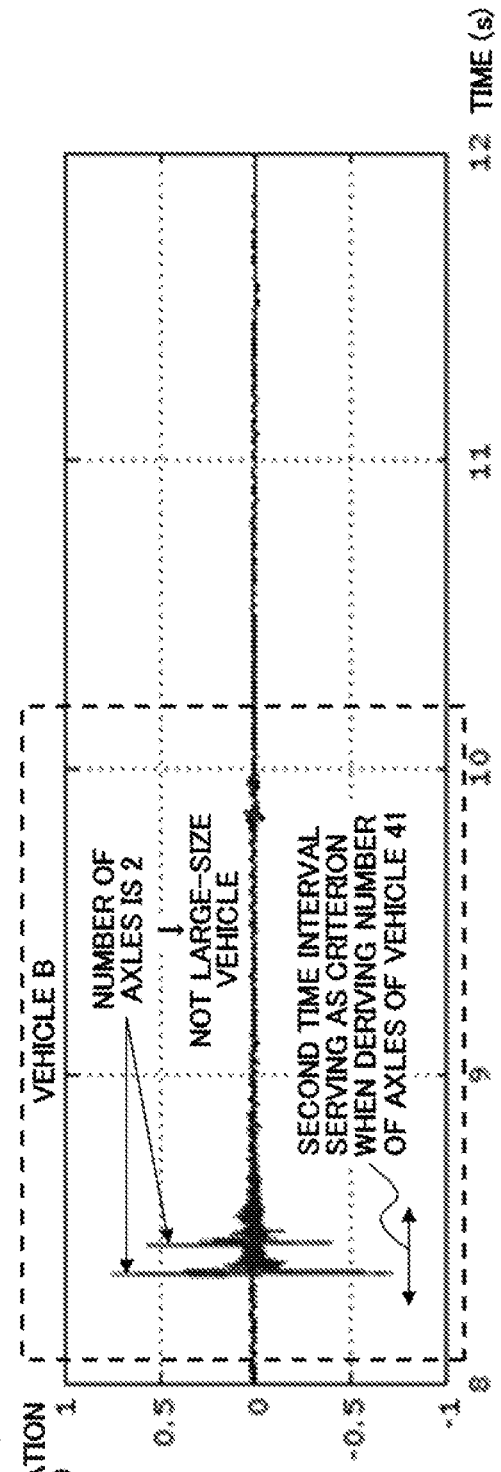
FIG. 4A is a diagram describing an example in which a determination unit 12 according to the first example embodiment of the invention of the present application determines, based on the acceleration-time-history-waveform 140 exemplified in FIG. 2A, that weight of the vehicle 41 does not satisfy a criterion.
Figure 4B:
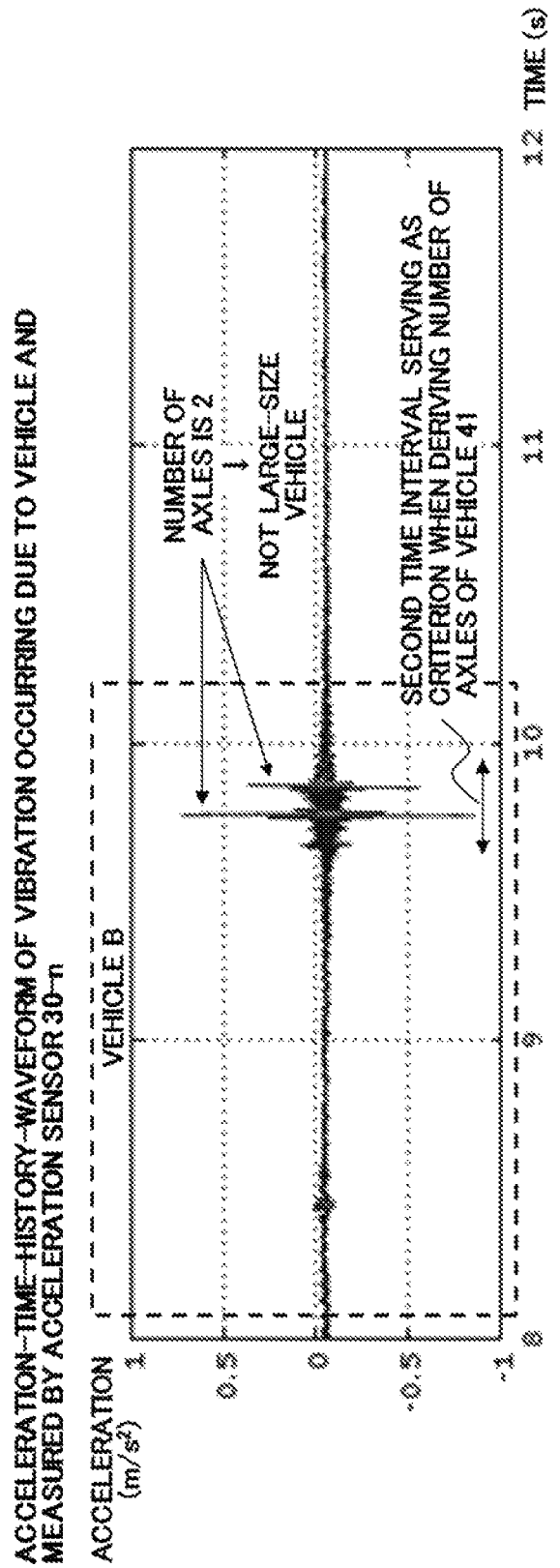
FIG. 4B is a diagram describing an example in which the determination unit 12 according to the first example embodiment of the invention of the present application determines, based on the acceleration-time-history-waveform 140 exemplified in FIG. 2B, that the weight of the vehicle 41 does not satisfy the criterion.

FIGS. 4A and 4B are diagrams describing an example in which the determination unit 12 according to the present example embodiment determines, based on the acceleration-time-history-waveforms 140 exemplified in FIGS. 2A and 2B, that the weight of the vehicle 41 does not satisfy the criterion. FIGS. 4A and 4B are diagrams displaying the acceleration-time-history-waveforms 140 illustrated in FIGS. 2A and 2B, respectively, in such a way that a part representing vibration due to the vehicle B is enlarged in a time-axis direction and an acceleration-axis direction.

As exemplified in FIGS. 4A and 4B, the determination unit 12 derives the number of peak points in a second time interval serving as a criterion when deriving the number of axles of the vehicle 41. This second time interval is a value indicating a general time required from passage of the most front (head) axle included in the vehicle 41 across the upper part of the expansion/contraction device 21 (or the expansion/contraction device 22) to passage of the most rear (end) axle included in the vehicle 41 across the upper part of the expansion/contraction device 21 (or the expansion/contraction device 22).

In the acceleration-time-history-waveforms 140 illustrated in FIGS. 4A and 4B, the number of peak points in the second time interval is "2", and therefore, the number of axles of the vehicle 41 (the vehicle B) is also "2". In this case, the determination unit 12 determines that the vehicle 41 is not a large-size vehicle, and the weight of the vehicle 41 does not satisfy the criterion.

FIGS. 5A and 5B are diagrams describing an example in which the determination unit 12 according to the present example embodiment determines, based on the acceleration-time-history-waveforms 140 exemplified in FIGS. 2A and 2B, that the weight of the vehicle 41 satisfies the criterion. FIGS. 5A and 5B are diagrams displaying the acceleration-time-history-waveforms 140 illustrated in FIGS. 2A and 2B, respectively, in such a way that a part representing vibration due to the vehicle C is enlarged in a time-axis direction and an acceleration-axis direction.

As exemplified in FIGS. 5A and 5B, the determination unit 12 derives the number of peak points in the second time interval.

In the acceleration-time-history-waveforms 140 illustrated in FIGS. 5A and 5B, the number of peak points in the second time interval is "3", and therefore, the number of axles of the vehicle 41 (the vehicle C) is also "3". In this case, the determination unit 12 determines that the vehicle 41 is a large-size vehicle, and the weight of the vehicle 41 satisfies the criterion.

The determination unit 12 reports a result of the above-described detection to the diagnosis unit 13. The determination unit 12 may store the detection result in the storage unit 14.

When a condition is satisfied, the diagnosis unit 13 illustrated in FIG. 1 diagnoses damage occurring in the bridge 20, based on the acceleration-time-history-waveform 140 representing free vibration occurring in the bridge 20 due to crossing of the vehicle 41. The condition is as follows. A detection result by the detection unit 11 satisfies a condition equivalent to a fact that, after the vehicle 41 crossing the bridge 20 exits from the bridge 20, crossing of the another vehicle 42 over the bridge 20 does not occur. A detection result by the determination unit 12 is that the weight of the vehicle 41 satisfies the criterion.

The diagnosis unit 13 diagnoses damage occurring in the bridge 20, based on an attenuation part included in the acceleration-time-history-waveform 140, starting at a peak point relating to the vehicle 41 and indicating exit from the bridge 20, and indicating that free vibration occurring in a bridge 60 due to crossing of the vehicle 41 attenuates with elapse of time. In this instance, the diagnosis unit 13 uses the acceleration-time-history-waveform 140 at a specific position in the bridge 20. The specific position in the bridge 20 is assumed to be a position other than both ends (i.e., places where the expansion/contraction devices 21 and 22 are placed) and a central part of the bridge 20. Specifically, the diagnosis unit 13 uses the acceleration-time-history-waveform 140 based on measurement data by at least one of the acceleration sensors 30-2 to 30-($n$−1). The diagnosis unit 13 calculates a frequency spectrum by performing Fourier transform for the acceleration-time-history-waveform 140 of the above-described specific position in the bridge 20.

The diagnosis unit 13 extracts a peak position in the derived frequency spectrum. The diagnosis unit 13 extracts a frequency or an attenuation rate (sharpness of a peak) at the peak position. The diagnosis unit 13 calculates, with regard to the extracted frequency or attenuation rate, a rate of change of the frequency or the attenuation rate from a criterion value. A criterion value of a frequency or an attenuation rate is, for example, a value of a frequency or an attenuation rate acquired when damage to be paid attention to does not occur in the bridge 20.

When a calculated change rate is equal to or more than a threshold value, the diagnosis unit 13 diagnoses that damage to be paid attention to (to be taken care of) occurs in the bridge 20. When a calculated change rate is less than a threshold value, the diagnosis unit 13 diagnoses that damage to be paid attention to does not occur in the bridge 20.

Since a technique of diagnosing, by the above-described diagnosis unit 13, damage occurring in the bridge 20, based on a rate of change of a frequency spectrum from a criterion value thereof relating to a frequency or an attenuation rate at a peak position is an existing technique, more detailed description relating to the technique is omitted in the present application. Note that using the above-described existing technique when the diagnosis unit 13 diagnoses damage occurring in the bridge 20 is one example, and a technique used by the diagnosis unit 13 is not limited to the above-described existing technique.

Next, an operation (processing) of the damage diagnosis device 10 according to the present example embodiment is described in detail with reference to flowcharts in FIGS. 6A and 6B.

The detection unit 11 and the determination unit 12 generate a band-limiting signal by performing the above-described frequency-band-limiting-processing for the acceleration-time-history-waveforms 140 acquired by the acceleration sensors 30-1 to 30-$n$ (step S101). The detection unit 11 and the determination unit 12 generate a plurality of pieces of integral information by integrating acceleration in relation to time, in relation to a plurality of different periods in the generated band-limiting signal (step S102). The detection unit 11 and the determination unit 12 extract, based on the generated integral information, peak points in the acceleration-time-history-waveforms 140 where each of the axles of the vehicle 41 and the another vehicle 42 passes the expansion/contraction devices 21 and 22 (step S103).

The detection unit 11 derives, based on the extracted peak point, a time interval from exit of the vehicle 41 from the bridge 20 to entrance of the another vehicle 42 onto the bridge 20 (step S104). When the derived time interval is not equal to or more than the first time interval (No in step S105), the diagnosis unit 13 determines that diagnosis of damage based on the acceleration-time-history-waveform 140 relating to the vehicle 41 is not a target (step S108), and the overall processing ends.

When the derived time interval is equal to or more than the first time interval (Yes in step S105), the determination unit 12 derives the number of axles of the vehicle 41, based on the number of extracted peak points included in the second time interval (step S106). When the derived number of axles is not equal to or more than "3" (i.e., equal to or less than "2") (No in step S107), the diagnosis unit 13 determines that diagnosis of damage based on the acceleration-time-history-waveform 140 relating to the vehicle 41 is not a target (step S108), and the overall processing ends.

When the derived number of axles is equal to or more than "3" (Yes in step S107), the diagnosis unit 13 calculates a frequency spectrum by performing Fourier transform for an attenuation part starting at a peak point relating to the vehicle 41 and indicating exit from the bridge 20 in the acceleration-time-history-waveform 140 acquired by the acceleration sensor (at least one of the acceleration sensors 30-2 to 30-(n−1)) placed at a specific position in the bridge 20 (step S109).

The diagnosis unit 13 determines a peak position of the frequency spectrum at the specific position (step S110). The diagnosis unit 13 extracts a frequency or an attenuation rate (sharpness of a peak) at the peak position (step S111).

The diagnosis unit 13 calculates, with regard to the extracted frequency or attenuation rate, a rate of change of the frequency or the attenuation rate from a criterion value, and determines whether the calculated change rate is equal to or more than a threshold value (step S112). When the calculated change rate is not equal to or more than the threshold value (No in step S113), the diagnosis unit 13 diagnoses that damage to be paid attention to does not occur in the bridge 20 (step S114), and the overall processing ends. When the calculated change rate is equal to or more than the threshold value (Yes in step S113), the diagnosis unit 13 diagnoses that damage to be paid attention to occurs in the bridge 20 (step S115), and the overall processing ends.

The damage diagnosis device 10 according to the present example embodiment can improve diagnosis precision when diagnosing damage to a bridge, based on information representing free vibration occurring in the bridge due to crossing of a vehicle. A reason for this is that the damage diagnosis device 10 diagnoses damage to the bridge 20, based on the acceleration-time-history-waveform 140 representing free vibration occurring in the bridge 20 due to crossing of the vehicle 41, when, after the vehicle 41 crossing the bridge 20 exits from the bridge 20, crossing of the another vehicle 42 over the bridge 20 does not occur, and the weight of the vehicle 41 satisfies the criterion.

An advantageous effect achieved by the damage diagnosis device 10 according to the present example embodiment is described below in detail.

When diagnosing damage to a bridge, the damage can be diagnosed by measuring free vibration occurring in the bridge after a vehicle crosses the bridge. However, in this case, there is fear that a wrong diagnosis is made due to the following factor. Specifically, when, in a state where free vibration occurs in a bridge after a vehicle crosses the bridge, another vehicle travels on the bridge, vibration occurring due to the traveling of the another vehicle is mixed into the free vibration, and therefore, it becomes difficult to accurately measure the free vibration. Alternatively, when weight of the vehicle does not satisfy a criterion, free vibration that occurs is small, and thus, it becomes difficult to extract, with high precision, a change in a mechanical characteristic of a bridge indicated by the free vibration. Therefore, when diagnosing damage to a bridge by measuring free vibration occurring in the bridge after a vehicle crosses the bridge, elimination of the above-described factor of wrong diagnosis is a problem.

Figure 6A:
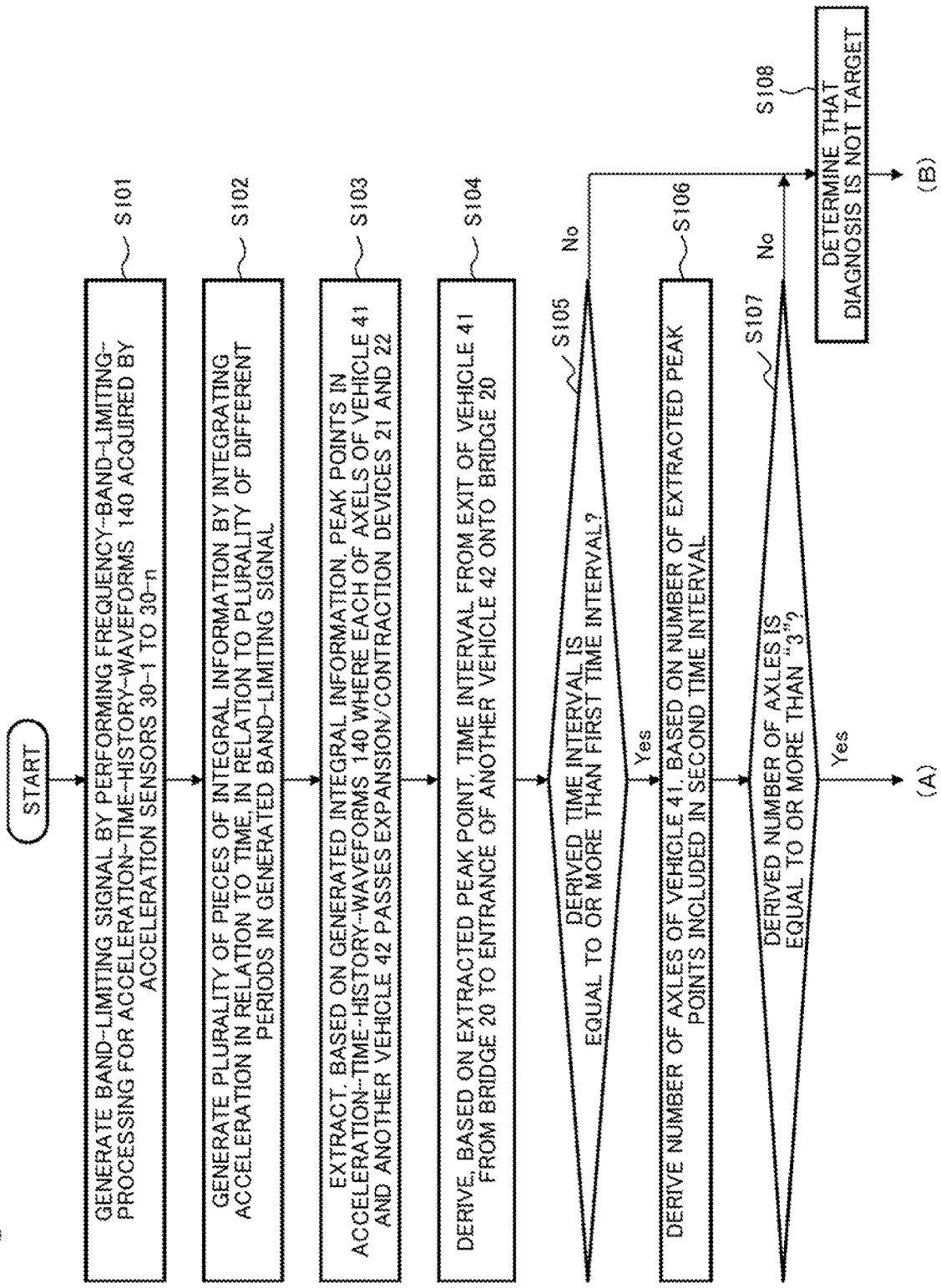
FIG. 6A is a flowchart (1/2) illustrating an operation of a damage diagnosis device 10 according to the first example embodiment of the invention of the present application.

For such a problem, the damage diagnosis device 10 according to the present example embodiment includes the detection unit 11, the determination unit 12, and the diagnosis unit 13, and operates, for example, as described above with reference to FIGS. 1 to 6 (FIGS. 6A and 6B). Specifically, the detection unit 11 detects that, after the vehicle 41 crossing the bridge 20 exits from the bridge 20, crossing of the another vehicle 42 over the bridge 20 does not occur. The determination unit 12 determines whether the weight of the vehicle 41 satisfies a criterion. Then, the diagnosis unit 13 diagnoses damage to the bridge 20, based on the acceleration-time-history-waveform 140 representing free vibration occurring in the bridge 20 due to crossing of the vehicle 41, when the detection unit 11 detects that crossing of the another vehicle 42 over the bridge 20 does not occur, and the determination unit 12 determines that the weight of the vehicle 41 satisfies the criterion.

Specifically, the acceleration-time-history-waveform 140 representing free vibration used when the damage diagnosis device 10 diagnoses damage occurring in the bridge 20 represents free vibration into which vibration occurring due to crossing of the another vehicle 42 over the bridge 20 is not mixed, and which represents free vibration occurring due to crossing of the vehicle 41 the weight of which satisfies a criterion on the bridge 20. Therefore, the damage diagnosis device 10 according to the present example embodiment can improve diagnosis precision when diagnosing damage occurring in a bridge, based on an acceleration-time-history-waveform representing free vibration occurring in the bridge due to crossing of a vehicle.

The damage diagnosis device 10 according to the present example embodiment detects, by extracting a peak point from the acceleration-time-history-waveform 140, that, after the vehicle 41 crossing the bridge 20 exits from the bridge 20, crossing of the another vehicle 42 over the bridge 20 does not occur, and determines whether the weight of the vehicle 41 satisfies a criterion. Specifically, the damage diagnosis device 10 according to the present example embodiment can perform the above-described detection and determination, based on the acceleration-time-history-waveform 140, and therefore, achieve, with a simple configuration, improvement in diagnosis precision when diagnosing damage occurring in a bridge.

The determination unit 12 according to the present example embodiment can determine, with a simple configuration, whether the weight of the vehicle 41 satisfies a criterion, by concentrating on a fact that, generally, a vehicle having small weight, such as a passenger car, tends to include two axels, and a vehicle having great weight, such as a truck, tends to include three or more axels.

Note that both the detection unit 11 and the determination unit 12 include a function of extracting a peak point in the acceleration-time-history-waveform 140 in the present example embodiment described above, but one of the detection unit 11 and the determination unit 12 may include a function of extracting a peak point. Specifically, for example, when the detection unit 11 alone includes a function of extracting a peak point, the detection unit 11 may input information indicating the extracted peak point to the determination unit 12.

The detection unit 11 according to the present example embodiment may detect that, after the vehicle 41 crossing the bridge 20 exits from the bridge 20, crossing of the another vehicle 42 over the bridge 20 does not occur, for example, by analyzing a video in which the bridge 20 is captured with an external imaging device (camera). Note that a camera capturing the bridge 20 may be an infrared camera as long as the camera is capable of detecting crossing of the vehicle or determining a kind of vehicle.

The determination unit 12 according to the present example embodiment may determine whether the weight of the vehicle 41 satisfies a criterion, for example, based on a video in which the bridge 20 is captured, or information acquired by a weight sensor placed on the bridge 20. In this case, the determination unit 12 may determine whether the weight of the vehicle 41 satisfies a criterion, for example, by collating an image representing the vehicle 41 included in a video in which the bridge 20 is captured, with information (a database) associating the image representing the vehicle 41 with the weight of the vehicle 41. The determination unit 12 can identify a type (e.g. a model name) of the vehicle 41 included in the video, for example, by using an image analysis technique in recent years. Alternatively, the determination unit 12 is also capable of determining whether the weight of the vehicle 41 satisfies a criterion, as illustrated in the present example embodiment described above, based on the number of axles of the vehicle 41 acquired by analyzing the image representing the vehicle 41.

At least one of the detection unit 11 and the determination unit 12 according to the present example embodiment may display the acceleration-time-history-waveform 140 relating to an entrance part (the expansion/contraction device 21) in the bridge 20 and the acceleration-time-history-waveform 140 relating to an exit part (the expansion/contraction device 22) in the bridge 20, over each other on a display device (not illustrated in FIG. 1), by matching time axes thereof, for example, as illustrated in FIG. 3. Specifically, the damage diagnosis device 10 according to the present example embodiment can improve user's convenience by presenting the acceleration-time-history-waveform 140 in such a way that the user can easily understand.

Note that the damage diagnosis device 10 according to the present example embodiment described above targets, for diagnosis, the bridge 20 including a one-way lane, but the damage diagnosis device 10 may target, for diagnosis, a bridge including lanes (opposite lanes) in both directions. In this case, the detection unit 11 may detect, with regard to both the lane and an opposite lane, that, after the vehicle 41 crossing one of the lanes exits from the bridge 20, crossing of the another vehicle 42 over the bridge 20 does not occur, based on the acceleration-time-history-waveforms 140 relating to the lanes in both the directions.

Second Example Embodiment

Figure 7:
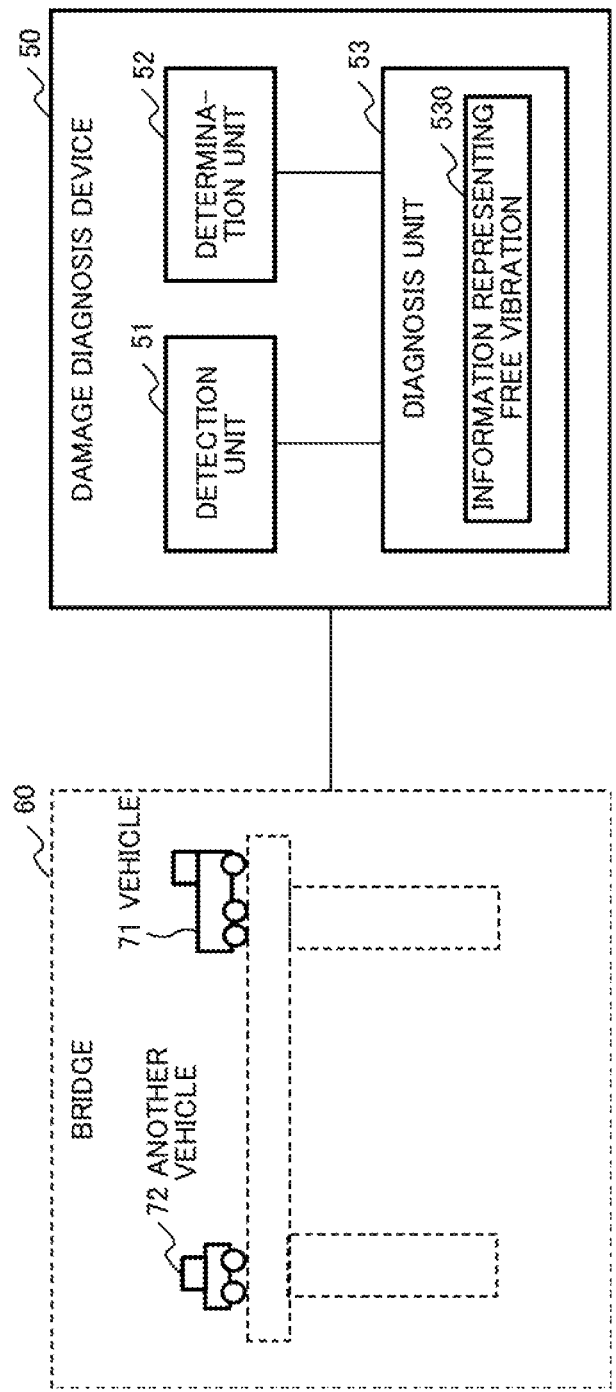
FIG. 7 is a block diagram conceptually illustrating a configuration of a damage diagnosis system 50 according to a second example embodiment of the invention of the present application.

FIG. 7 is a block diagram conceptually illustrating a configuration of a damage diagnosis system 50 according to a second example embodiment of the invention of the present application.

The damage diagnosis device 50 according to the present example embodiment includes a detection unit 51, a determination unit 52, and a diagnosis unit 53.

The detection unit 51 detects that, after a vehicle 71 crossing a bridge 60 exits from the bridge 60, crossing of another vehicle 72 over the bridge 60 does not occur.

The determination unit 52 determines whether weight of the vehicle 71 satisfies a criterion.

The diagnosis unit 53 diagnoses damage to the bridge 60, based on information representing information 530 representing free vibration occurring in the bridge 60 due to crossing of the vehicle 71, when the detection unit 51 detects that crossing of the another vehicle 72 over the bridge 60 does not occur, and the determination unit 52 determines that the weight of the vehicle 71 satisfies the criterion.

The damage diagnosis device 50 according to the present example embodiment can improve diagnosis precision when diagnosing damage to a bridge, based on information representing free vibration occurring in the bridge due to crossing of a vehicle. A reason for this is that the damage diagnosis device 50 diagnoses damage to the bridge 60, based on the information 530 representing free vibration occurring in the bridge 60 due to crossing of the vehicle 71, when, after the vehicle 71 crossing the bridge 60 exits from the bridge 60, crossing of the another vehicle 72 over the bridge 60 does not occur, and the weight of the vehicle 71 satisfies the criterion.

Hardware Configuration Example

Each unit in each of the damage diagnosis devices illustrated in FIGS. 1 and 7 in each of the example embodiments described above can be achieved by dedicated hardware (HW) (electronic circuit). In FIGS. 1 and 7, at least the following configuration can be considered as a functional (processing) unit (software module) of a software program.
Detection units 11 and 51,
determination units 12 and 52, and
diagnosis units 13 and 53.

Classification of each unit illustrated in the drawings is a configuration serving for convenience of description, and various configurations are conceivable during implementation. One example of a hardware environment in this case is described with reference to FIG. 8.

FIG. 8 is a diagram exemplarily describing a configuration of an information processing device 900 (computer) being capable of executing the damage diagnosis device according to each example embodiment of the invention of the present application. Specifically, FIG. 8 represents a hardware environment being a configuration of a computer (information processing device) capable of achieving the damage diagnosis devices 10 and 50 illustrated in FIGS. 1 and 7, and being capable of achieving each function in the example embodiments described above.

The information processing device 900 illustrated in FIG. 8 includes the following as components.
A central processing unit (CPU) 901,
a read only memory (ROM) 902,
a random access memory (RAM) 903,
a hard disk (storage device) 904,
a communication interface 905 with an external device,
a bus 906 (communication wire),
a reader/writer 908 capable of reading and writing data stored in a recording medium 907 such as a compact disc read only memory (CD-ROM), and
an input/output interface 909 (including a display device or the like).

Specifically, the information processing device 900 including the components described above is a general computer to which these components are connected via the bus 906. The information processing device 900 may include a plurality of CPUs 901, or include a multicore CPU 901.

The invention of the present application described with the above-described example embodiments as examples supplies the information processing device 900 illustrated in FIG. 8 with a computer program capable of achieving the following function. The function is a function of the above-described configuration in the block configuration diagrams (FIGS. 1 and 7) referred to in the description of the example embodiments, or the flowchart (FIGS. 6A and 6B). Thereafter, the invention of the present application is accomplished by reading the computer program in the CPU 901 of the hardware, and then interpreting and executing the computer program. The computer program supplied into the device may be stored in a readable/writable volatile memory (the RAM 903), or a non-volatile storage device such as the ROM 902 or the hard disk 904.

In the above-described case, a nowadays general procedure can be adopted as a method of supplying a computer program into the hardware. As the procedure, there is, for example, a method that installs the program into the device via various recording media 907 such as a CD-ROM, a method that downloads the program from outside via a communication line such as the Internet, or the like. In such a case, it can be considered that the invention of the present application is configured by a code constituting the computer program, or the recording medium 907 storing the code.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Note that some or all of the above-described example embodiments may be also described as in the following supplementary notes. However, the invention of the present application exemplarily described with each of the above-described example embodiments is not limited to the following.

(Supplementary Note 1)

A damage diagnosis device including:

a detection means for detecting that, after a vehicle crossing a bridge exits from the bridge, crossing of another vehicle over the bridge does not occur;

a determination means for determining whether weight of the vehicle satisfies a criterion; and a diagnosis means for diagnosing damage to the bridge, based on information representing free vibration occurring in the bridge due to crossing of the vehicle, when the detection means detects that crossing of the another vehicle over the bridge does not occur and the determination means determines that the weight of the vehicle satisfies the criterion.

(Supplementary Note 2)

The damage diagnosis device according to Supplementary Note 1, wherein, when an acceleration sensor being capable of acquiring information necessary for generation of information representing an acceleration-time-history-waveform relating to the free vibration acquires information representing peak points in the acceleration-time-history-waveform indicating that the vehicle and the another vehicle enter the bridge and exit from the bridge, the detection means extracts a plurality of the peak points included in the acceleration-time-history-waveform, and detects that a relation between a timing indicated by the extracted peak point at which the vehicle exits from the bridge, and a timing indicated by the extracted peak point at which the another vehicle enters the bridge satisfies a predetermined condition.

(Supplementary Note 3)

The damage diagnosis device according to Supplementary Note 1, wherein, when an acceleration sensor being capable of acquiring information necessary for generation of information representing an acceleration-time-history-waveform relating to the free vibration acquires information representing a peak point in the acceleration-time-history-waveform, the peak point indicating that each of a plurality of axles included in the vehicle passes a predetermined place on the bridge, the determination means extracts a plurality of the peak points included in the acceleration-time-history-waveform, and determines that the weight of the vehicle satisfies the criterion when a number of the axles indicated by the peak points being extracted satisfies a predetermined condition.

(Supplementary Note 4)

The damage diagnosis device according to Supplementary Note 2 or 3, wherein at least one of the detection means and the determination means generates a band-limiting signal by performing frequency-band-limiting-processing on information representing the acceleration-time-history-waveform, and then extracts the peak point, based on the band-limiting signal being generated.

(Supplementary Note 5)

The damage diagnosis device according to Supplementary Note 4, wherein at least one of the detection means and the determination means generates a plurality of pieces of integral information by integrating acceleration in relation to time, in relation to a plurality of different periods in the band-limiting signal, and then extracts the peak point, based on the plurality of pieces of integral information being generated.

(Supplementary Note 6)

The damage diagnosis device according to Supplementary Note 5, wherein the integral information indicates a value acquired by deriving a root-mean-square with regard to the acceleration at a plurality of different times included in the period.

(Supplementary Note 7)

The damage diagnosis device according to Supplementary Note 1, wherein the detection means detects that the crossing of the another vehicle over the bridge does not occur, by analyzing a video in which the bridge is captured.

(Supplementary Note 8)

The damage diagnosis device according to Supplementary Note 1, wherein the determination means determines whether the weight of the vehicle satisfies the criterion, based on a video in which the bridge is captured, or information acquired by a weight sensor placed on the bridge.

(Supplementary Note 9)

The damage diagnosis device according to Supplementary Note 8, wherein the determination means determines whether the weight of the vehicle satisfies the criterion, by collating an image representing the vehicle included in the video in which the bridge is captured, with information associating the image representing the vehicle with the weight of the vehicle.

(Supplementary Note 10)

The damage diagnosis device according to any one of Supplementary Notes 7 to 9, wherein the video is captured by an infrared camera.

(Supplementary Note 11)

The damage diagnosis device according to any one of Supplementary Notes 2 to 6, wherein the diagnosis means diagnoses damage occurring in the bridge, based on an attenuation part included in the acceleration-time-history-waveform, the attenuation part starting at the peak point that indicates exit from the bridge relating to the vehicle, and indicating that the free vibration occurring in the bridge due to the crossing of the vehicle attenuates with elapse of time.

(Supplementary Note 12)

The damage diagnosis device according to Supplementary Note 11, wherein the diagnosis means calculates a frequency spectrum by performing Fourier transform on the attenuation part, determines a peak position of the frequency spectrum being calculated, calculates a change rate relative to a referential frequency or a referential attenuation rate, in relation to a frequency or attenuation rate at the peak position being determined, and determines whether the change rate being calculated is equal to or more than a threshold value.

(Supplementary Note 13)

The damage diagnosis device according to Supplementary Note 2 or 3, wherein at least one of the detection means and the determination means displays the acceleration-time-history-waveform relating to an entrance part of the bridge and the acceleration-time-history-waveform relating to an exit part of the bridge, with overlapping each other on a display device, by matching time axes thereof.

(Supplementary Note 14)

A damage diagnosis system including:

the damage diagnosis device according to Supplementary Note 2 or 3; and the acceleration sensor.

(Supplementary Note 15)

A damage diagnosis method including, by an information processing device:

detecting that, after a vehicle crossing a bridge exits from the bridge, crossing of another vehicle over the bridge does not occur;

determining whether weight of the vehicle satisfies a criterion; and diagnosing damage to the bridge, based on information representing free vibration occurring in the bridge due to crossing of the vehicle, when detecting that crossing of the another vehicle over the bridge does not occur and determining that the weight of the vehicle satisfies the criterion.

(Supplementary Note 16)

A recording medium storing a damage diagnosis program for causing a computer to execute:

detection processing of detecting that, after a vehicle crossing a bridge exits from the bridge, crossing of another vehicle over the bridge does not occur;

determination processing of determining whether weight of the vehicle satisfies a criterion; and diagnosis processing of diagnosing damage to the bridge, based on information representing free vibration occurring in the bridge due to crossing of the vehicle, when the detection processing detects that crossing of the another vehicle over the bridge does not occur and the determination processing determines that the weight of the vehicle satisfies the criterion.

This application is based upon and claims the benefit of priority from Japanese Patent Application No. 2017-234804, filed on Dec. 7, 2017, the disclosure of which is incorporated herein in its entirety by reference.

REFERENCE SIGNS LIST

1 Damage diagnosis system
10 Damage diagnosis device
11 Detection unit
12 Determination unit
13 Diagnosis unit
14 Storage unit
140 Acceleration-time-history-waveform
15 Communication unit
20 Bridge
21, 22 Expansion/contraction device
30-1 to 30-$n$ Acceleration sensor
31 Measurement data aggregator
41 Vehicle
42 Another vehicle
50 Damage diagnosis device
51 Detection unit
52 Determination unit
53 Diagnosis unit
530 Information representing free vibration
60 Bridge
71 Vehicle
72 Another vehicle
900 Information processing device
901 CPU
902 ROM
903 RAM
904 Hard disk
905 Communication interface
906 Bus
907 Recording medium
908 Reader/writer
909 Input/output interface

The invention claimed is:

1. A damage diagnosis device comprising:

at least one memory storing a computer program; and at least one processor configured to execute the computer program to:

when analyzing measurement information representing free vibration occurring in a bridge due to crossing of a vehicle, detect that, after the vehicle crossing the bridge exits from the bridge, crossing of another vehicle over the bridge does not occur;

determine whether weight of the vehicle satisfies a criterion; and diagnose damage to the bridge, based on the measurement information, when detecting that crossing of the another vehicle over the bridge does not occur and determining that the weight of the vehicle satisfies the criterion.

2. The damage diagnosis device according to claim 1, wherein the processor is configured to execute the computer program to, when an acceleration sensor being capable of acquiring information necessary for generation of information representing an acceleration-time-history-waveform relating to the free vibration acquires information representing peak points in the acceleration-time-history-waveform, indicating that the vehicle and the another vehicle enter the bridge and exit from the bridge extract a plurality of the peak points included in the acceleration-time-history-waveform; and detect that a relation between a timing indicated by the extracted peak point at which the vehicle exits from the bridge, and a timing indicated by the extracted peak point at which the another vehicle enters the bridge satisfies a predetermined condition.

3. The damage diagnosis device according to claim 2, wherein the processor is configured to execute the computer program to:
generate a band-limiting signal by performing frequency-band-limiting-processing on information representing the acceleration-time-history waveform; and
extract the peak point, based on the band-limiting signal being generated.

4. The damage diagnosis device according to claim 3, wherein the processor is configured to execute the computer program to:
generate a plurality of pieces of integral information by integrating acceleration in relation to time, in relation to a plurality of different periods in the band-limiting signal; and
extract the peak point, based on the plurality of pieces of integral information being generated.

5. The damage diagnosis device according to claim 4, wherein
the integral information indicates a value acquired by deriving a root-mean-square with regard to the acceleration at a plurality of different times included in the period.

6. The damage diagnosis device according to claim 2, wherein the processor is configured to execute the computer program to
diagnose damage occurring in the bridge, based on an attenuation part included in the acceleration-time-history-waveform, the attenuation part starting at the peak point that indicates exit from the bridge relating to the vehicle, and indicating that the free vibration occurring in the bridge due to the crossing of the vehicle attenuates with elapse of time.

7. The damage diagnosis device according to claim 6, wherein the processor is configured to execute the computer program to:
calculate a frequency spectrum by performing Fourier transform on the attenuation part;
determine a peak position of the frequency spectrum being calculated;
calculate a change rate relative to a referential frequency or a referential attenuation rate, in relation to a frequency or attenuation rate at the peak position being determined; and
determine whether the change rate being calculated is equal to or more than a threshold value.

8. The damage diagnosis device according to claim 2, wherein the processor is configured to execute the computer program to
display the acceleration-time-history-waveform relating to an entrance part of the bridge and the acceleration-time-history-waveform relating to an exit part of the bridge, with overlapping each other on a display device, by matching time axes thereof.

9. The damage diagnosis device according to claim 1, wherein the processor is configured to execute the computer program to,
when an acceleration sensor being capable of acquiring information necessary for generation of information representing an acceleration-time-history-waveform relating to the free vibration acquires information representing a peak point in the acceleration-time-history-waveform, the peak point indicating that each of a plurality of axles included in the vehicle passes a predetermined place on the bridge:
extract a plurality of the peak points included in the acceleration-time-history-waveform; and
determine that the weight of the vehicle satisfies the criterion when a number of the axles indicated by the peak points being extracted satisfies a predetermined condition.

10. The damage diagnosis device according to claim 1, wherein the processor is configured to execute the computer program to
detect that the crossing of the another vehicle over the bridge does not occur, by analyzing a video in which the bridge is captured.

11. The damage diagnosis device according to claim 10, wherein
the video is captured by an infrared camera.

12. The damage diagnosis device according to claim 1, wherein the processor is configured to execute the computer program to
determine whether the weight of the vehicle satisfies the criterion, based on a video in which the bridge is captured, or information acquired by a weight sensor placed on the bridge.

13. The damage diagnosis device according to claim 12, wherein the processor is configured to execute the computer program to
determine whether the weight of the vehicle satisfies the criterion, by collating an image representing the vehicle included in the video in which the bridge is captured, with information associating the image representing the vehicle with the weight of the vehicle.

14. A damage diagnosis method comprising, by an information processing device:
when analyzing measurement information representing free vibration occurring in a bridge due to crossing of a vehicle,
detecting that, after the vehicle crossing the bridge exits from the bridge, crossing of another vehicle over the bridge does not occur;
determining whether weight of the vehicle satisfies a criterion; and
diagnosing damage to the bridge, based on the measurement information, when detecting that crossing of the another vehicle over the bridge does not occur and determining that the weight of the vehicle satisfies the criterion.

15. A non-transitory computer-readable recording medium storing a damage diagnosis program for causing a computer to execute:
when analyzing measurement information representing free vibration occurring in a bridge due to crossing of a vehicle,
detection processing of detecting that, after the vehicle crossing the bridge exits from the bridge, crossing of another vehicle over the bridge does not occur;
determination processing of determining whether weight of the vehicle satisfies a criterion; and
diagnosis processing of diagnosing damage to the bridge, based on the measurement information, when the detection processing detects that crossing of the another vehicle over the bridge does not occur and the determination processing determines that the weight of the vehicle satisfies the criterion.

* * * * *